No. 811,280. PATENTED JAN. 30, 1906.
S. E. DAVIS.
YIELDING LINK FOR SEEDERS AND OTHER MACHINES.
APPLICATION FILED APR. 10, 1905.

Witnesses.
E. W. Jeppesen,
R. C. Mabry.

Inventor.
Spencer E. Davis.
By his Attorneys.
Williamson & Merchant

UNITED STATES PATENT OFFICE.

SPENCER E. DAVIS, OF MINNEAPOLIS, MINNESOTA, ASSIGNOR TO THE MONITOR DRILL CO., OF ST. LOUIS PARK, MINNESOTA, A CORPORATION OF MINNESOTA.

YIELDING LINK FOR SEEDERS AND OTHER MACHINES.

No. 811,280.     Specification of Letters Patent.     Patented Jan. 30, 1906.

Application filed April 10, 1905. Serial No. 254,666.

*To all whom it may concern:*

Be it known that I, SPENCER E. DAVIS, a citizen of the United States, residing at Minneapolis, in the county of Hennepin and State of Minnesota, have invented certain new and useful Improvements in Yielding Links for Seeders and other Machines; and I do hereby declare the following to be a full, clear, and exact description of the invention, such as will enable others skilled in the art to which it appertains to make and use the same.

My invention has for its object to provide an improved "spring-link," so called, especially adapted for use in the combined lifting and spring-pressure devices of seeders, drills, cultivators, plows, harrows, and other agricultural implements; and to this end the invention consists of the novel devices and combinations of devices hereinafter described, and defined in the claims.

The invention is illustrated in the accompanying drawings, wherein like characters indicate like parts throughout the several views.

Figure 1:
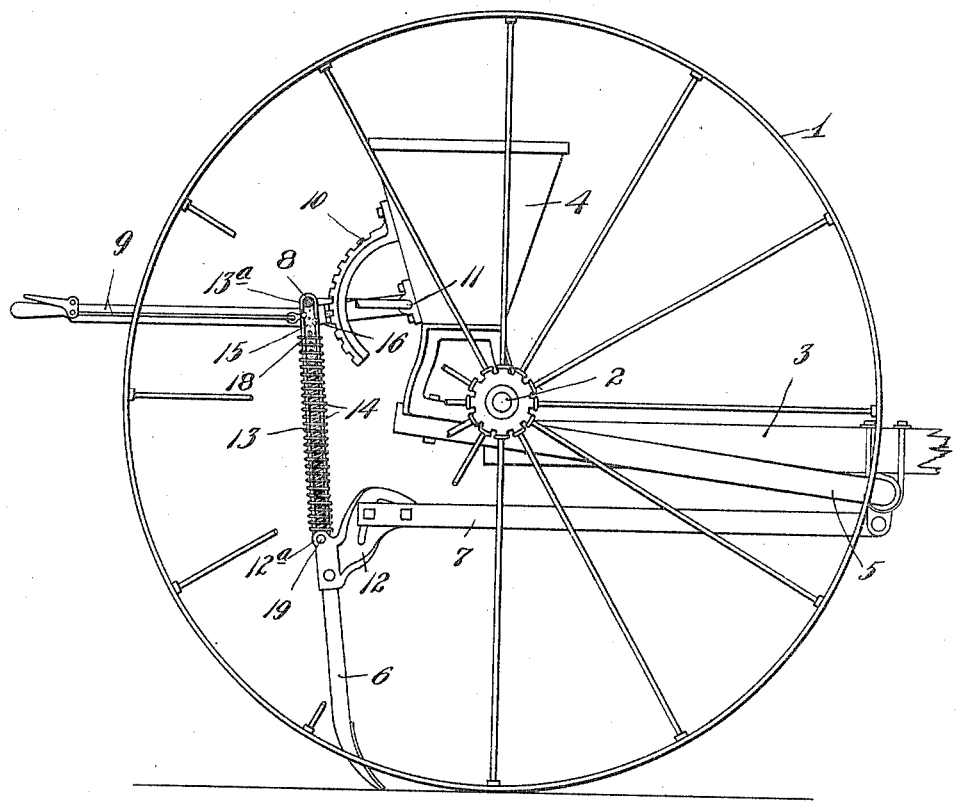
Figure 2:
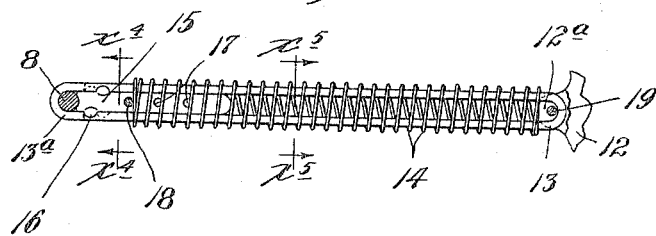
Figure 4:
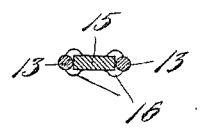
Figure 3:
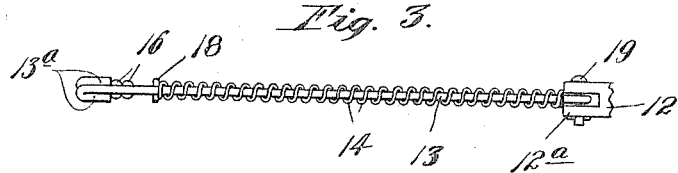
Figure 5:
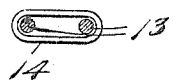

Figure 1 is a view in side elevation with some parts broken away and with some parts removed, illustrating my invention applied to a seeder of the type known to the trade as the "Monitor." Fig. 2 is a detail in side elevation, showing the improved spring-link removed from the machine. Fig. 3 is a plan view of the parts shown in Fig. 2. Fig. 4 is a section on the line $x^4 x^4$ of Fig. 2, and Fig. 5 is a section on the line $x^5 x^5$ of said Fig. 2.

Of the parts of the seeder it is only necessary to note the wheels 1, the axle 2, the pole 3, the seed-hopper 4, the frame 5, the teeth 6, the drag-bars 7, the lifting-bail 8, the latch-lever 9, and the lock-segment 10, which parts are all of the usual construction. It may be further stated that the lever 9 is connected for movement with the bail 8, which bail is pivoted to the hopper or seedbox 4 at 11, and that the latch of the lever 9 coöperates with said segment 10 to hold said bail 8 in any position in which it may be set. In the drawings only one tooth 6 and one drag-bar 7 are shown; but it will of course be understood that in a working machine a plurality of said parts 6 7 will be located side by side.

My improved "spring-link," so called, is applied between the rear transverse bar of the bail 8 and a coupling-block 12, which block, as shown, is applied to the upper end of the tooth 6 and rigidly but adjustably connects the same to the rear end of the drag-bar 7. The rigid part of the spring-link is formed by a rod 13, which is bent upon itself to form an elongated loop having parallel sides that are spaced apart only a short distance from each other. At one end of the loop the ends of the rod 13 are bent to form reversely-turned overlapping hooks $13^a$.

The numeral 14 indicates a flattened coiled spring which is wound around the looped rod 13 and closely fits the outer surfaces of the parallel sides thereof.

The numeral 15 indicates an elongated metallic filling-block that fits between the sides of the looped rod 13 and is provided with projecting lips 16, that engage the inner surfaces of the sides of said looped rod, as best shown in Figs. 2 and 4, and hold the said block against lateral displacement. The block 15 is provided with a row of perforations 17, through any one of which a pin or bolt 18 is adapted to be passed to afford a base of reaction for one end of the spring 14.

The filling-block 15 can be removed from the looped rod 13 only when the sides thereof are spread apart considerably farther than shown in Fig. 2, and the said side of the rod 13 can be thus separated or spread apart only when the spring 14 has first been removed. Thus it will be seen that the spring 14 indirectly holds the said block 15 in working position, and, as will be presently noted, the said spring, acting on the sides of the rod 13, holds the hooks $13^a$ thereof overlapped and in working positions, so that they can be applied to and removed from the bail 8 only when the said spring is removed from the looped rod 13 or is forced a very great distance away from the hooked ends thereof.

In applying the improved spring-link above described its hooked ends $13^a$ are preferably engaged with the vertically-movable transverse portion of the bail 8, and the upper end of the block 15 is forced against the said bail. The spring 14 is then applied on the looped rod 13 by a telescoping movement, and the lower end of the looped rod 13 is then pivotally attached to and between ears 12ᵃ of the block 12 by means of a pin or bolt 19.

When the link is applied as just noted, it is evident that it will serve as an unyielding connection between the bail 8 and the tooth for the purpose of raising or lifting the latter, but serves as a yielding pressure connection for forcing the tooth into the ground under a downward movement of the lever 9.

The principal purpose of the filling-block 15 is to provide an efficient means for adjusting the tension of the spring 14; but where such adjustment is not required the said block may be dispensed with. When the improved link is applied as shown in the drawings, one end thereof reacts against the pin 18, as already stated, and the other end thereof, as is evident, reacts against the lugs 12ᵃ of the coupling-block 12.

A flattened coil-spring is preferably employed, because it has greater elasticity than a coiled spring which is round in cross-section; but a coiled spring of a latter-noted form may be employed when desired.

The improved link described, while of small cost, is extremely efficient for the purposes had in view and may be very quickly applied in working position and removed therefrom. From what has already been said it will be understood that the improved spring-link is capable of modification in its details of construction and is capable of a great many different uses and applications. It is, however, especially adapted for use as a combined lifting-link and yielding pressure device for agricultural machines of the general character enumerated in the introductory paragraph of this specification. The improved device has been constructed and put into actual use, and its efficiency has been demonstrated.

In some instances where a yielding pressure device is not desired the spring 14 and the filling-block 15 may be dispensed with. The rod bent upon itself to form an elongated loop or yoke and having its ends bent at one end of the loop to form overlapping hooks is believed to be a novel feature in itself, and I desire to claim the same as such.

What I claim, and desire to secure by Letters Patent of the United States, is as follows:

1. A spring-link, comprising a single rod bent upon itself, to form an elongated loop, and having its ends bent at one extremity of the loop to form overlapping hooks, and a coiled spring surrounding said looped rod, and closely engaging the sides thereof, substantially as described.

2. A spring-link, comprising a single rod bent upon itself to form an elongated loop, and having its ends bent at one extremity of the loop to form overlapping hooks, a filling-block interposed between the sides of said looped rod, and a coiled spring surrounding said looped rod, and reacting at one end against said filling-block, substantially as described.

3. The combination with a rod bent upon itself to form an elongated loop having parallel sides, the ends of said rod being bent at one extremity of the loop to form overlapping hooks, a filling-block working between the sides of said loop, near the hooked ends thereof, and a coiled spring surrounding said looped rod, and flattened to closely engage the sides thereof, substantially as described.

4. The combination with a rod 13 bent upon itself to form a loop with parallel sides, the ends of said rod being bent to form the overlapping hooks 13ᵃ, and the coiled spring 14 surrounding said looped rod, reacting against said block 15, at one end, and flattened to closely engage the sides of said looped rod, substantially as described.

5. The combination with a rod 13 bent upon itself to form a loop with parallel sides, the ends of said rod being bent to form overlapping hooks 13ᵃ, the filling-block 15 fitting between the sides of said looped rod, and having lips 16 engaging the sides of said rod, and the coiled spring 14 surrounding said looped rod, reacting against said block 15, at one end, and flattened to closely engage the sides of said looped rod, substantially as described.

6. The combination with the rod 13 bent upon itself to form an elongated loop having parallel sides, the ends of said rod being bent to form overlapping hooks 13ᵃ, the flattened coiled spring 14 surrounding said looped rod 13, the filling-block 15 fitting between the sides of said looped rod and having several perforations 17, and the pin or bolt 18 affording a base of reaction for one end of said spring and engageable with any of said perforations, to vary the tension of said spring, substantially as described.

7. In a machine of the character described, the combination with a lever-operated vertically-movable presser-bar, and a drag-bar having a tooth or ground-engaging device, of a link connecting said presser-bar to a part on the rear end of said drag-bar, said link comprising a rod bent upon itself to form an elongated loop having overlapping hooks at one end of the loop, and a coiled spring surrounding and closely engaging the sides of said looped rod, substantially as described.

8. A link formed by a rod bent upon itself to form an elongated loop and having its ends bent to form overlapping hooks, and the members surrounding the intermediate portion of said looped rod to prevent separation of the hooked ends thereof, but itself removable from said rods, substantially as described.

9. In a machine of the character described, the combination with a lever - operative presser-bar and a drag-bar having a tooth or ground-engaging device, of a link formed by a rod bent upon itself to form an elongated loop embracing said presser-bar at its upper end and pivotally attached at its lower end to a part carried by the free end of said drag-bar, substantially as described.

In testimony whereof I affix my signature in presence of two witnesses.

SPENCER E. DAVIS.

Witnesses:
H. D. KILGORE,
F. D. MERCHANT.